United States Patent [19]

Harris

[11] 3,741,647

[45] June 26, 1973

[54] MICROFILM COPIER
[75] Inventor: James W. Harris, Huntsville, Ala.
[73] Assignee: Microcopy Inc., Huntsville, Ala.
[22] Filed: Dec. 18, 1970
[21] Appl. No.: 99,502

[52] U.S. Cl. .................................. 355/50, 355/55
[51] Int. Cl. ..................... G03b 27/48, G03b 27/50
[58] Field of Search ........................... 355/50, 51, 55

[56] References Cited
UNITED STATES PATENTS

| 2,837,966 | 6/1958 | Arnold et al. | 355/51 |
| 3,283,648 | 11/1966 | Froese | 355/55 X |
| 3,598,489 | 8/1971 | Thomas et al. | 355/51 |

Primary Examiner—Samuel S. Matthews
Assistant Examiner—Richard A. Wintercorn
Attorney—Cushman, Darby & Cushman

[57] ABSTRACT

A microfilm copier which permits continuous photographic copying from microfilm to paper or from paper to microfilm. The paper may be in the form of a roll or single sheets. The microfilm copier includes supply and take-up rolls for the microfilm and paper, a lens and projection lamp assembly for projecting from the developed to unexposed rolls, and a speed reducer for driving the paper and film rolls synchronously. In addition, the speed reducer compensates for changes in magnification factor between the microfilm and paper to maintain a proper ratio of driving rates between the paper drive means and the film drive means. Other features include, a crank and paper magazine carriage for changing the magnification factor, and a variable torque clutch for translating power from an input motor to the paper drive roller as a function of the amount of paper on the roll.

Some modifications to the basic microfilm copier include a drum holding a variety of lenses for changing magnification factors, a special magazine for holding microfilm which has been spliced end to end and looped for continuous projection, and an oscillating exposure plate adjacent to the paper exposure slot of the machine for making cutter marks on the exposed film when the microfilm copier is operating in a single sheet mode. A final modification involves the substitution for the paper magazine of another film magazine whereby a film microfilm copier is obtained.

23 Claims, 12 Drawing Figures

INVENTOR
JAMES W. HARRIS

PATENTED JUN 26 1973

INVENTOR
JAMES W. HARRIS
BY Cushman, Darby, Cushman
ATTORNEYS

INVENTOR
JAMES W. HARRIS
BY Cushman, Darby & Cushman
ATTORNEYS

MICROFILM COPIER

This invention relates to photocopying machines and specifically those machines in which documents or rolls of image bearing paper are photographed onto reels of microfilm, or developed microfilm is projected onto photosensitive rolls of paper. This invention also relates to machines for copying from one film to another.

Photocopying machines as described above are well known. In fact, the photocopying art may with good cause be considered a crowded art. Nevertheless, not all the technical problems which attend the photocopying process have been resolved by the prior art. The most glaring deficiency in prior photocopying machines which were designed to continuously copy from paper to film or from film to paper is that when the magnification factor between the paper and film was changed, the image of a point on the developed web no longer remained stationary on the photosensitive web for a proper time. In other words, an underdeveloped or overdeveloped photosensitive web resulted from a change in magnification factor. This problem has been eliminated by the speed reducer utilized in the present invention which is coordinated with the means for changing the magnification factors so that the relative drive rate of the film and photosensitive paper always produces proper exposure.

A second problem area in the prior art was the proper transfer of torque from a drive motor to the heavy paper roll. This invention has solved that problem by providing a variable torque clutch which varies the torque transfer to the paper roll as an inverse function of the speed of the roll. Thus when the paper roll comes up to full motor speed and less torque is required, less is transferred by the variable torque clutch.

A third problem solved by applicant's invention is that of projecting a piece of film 2 inches or shorter without splicing on long leaders. The applicant solved this problem by providing a projection lamp assembly in which the condensing lenses, while normal in their horizontal and cross-sectional dimensions, have been cut down in the vertical plane (in the direction of film travel) which permits the projector to have a minimum vertical dimension.

The prior art also found difficulty in making plural copies of a roll of developed film. Until the present time this process has required that the film be taken from the windup reel and replaced on the supply reel. The applicant has solved this problem by the provision of a special film loop magazine. When it is desired to make plural photocopies from the developed microfilm, the operator merely loops the film, splices the film end to end and places the loop in the space provided in the film loop magazine.

Yet another problem encountered in the prior art was a simple yet compact means for changing the magnification factor. The applicant has solved this problem by providing a drum to the periphery of which are attached plural lenses. This drum has its rotating axis parallel to but displaced from the optical axis of the microfilm copier so that any one lens may be rotated into the optical axis of the microfilm copier at a given time.

One other problem encountered by the prior art when copying from single sheets to microfilm was how to place a mark on the microfilm at the end of the image produced by each single sheet. The applicant has solved this problem by placing adjacent to the single sheet exposure slot an oscillating plate which causes an exposure mark to be placed upon the exposed film adjacent to the edges of the projected image of a single sheet.

Another problem solved by the applicant is how to load and unload the paper magazine. In this area the applicant's invention allows a much greater flexibility of operation than was possible with the prior art. The paper magazine is designed to be totally removable from the microfilm copier so that a second magazine can be loaded and the microfilm copier operated while the exposed paper is removed from the magazine in another area under darkroom conditions. Alternatively, the paper magazine has special mounts which allow the magazine to be loaded while it is mounted upon the microfilm copier.

Finally, the applicant also has improved the access of the operator to the film route by providing an access door for the film magazine which opens up the film slot even when both the supply and take-up magazines are mounted.

DETAILED DESCRIPTION OF THE INVENTION

Figure 1:
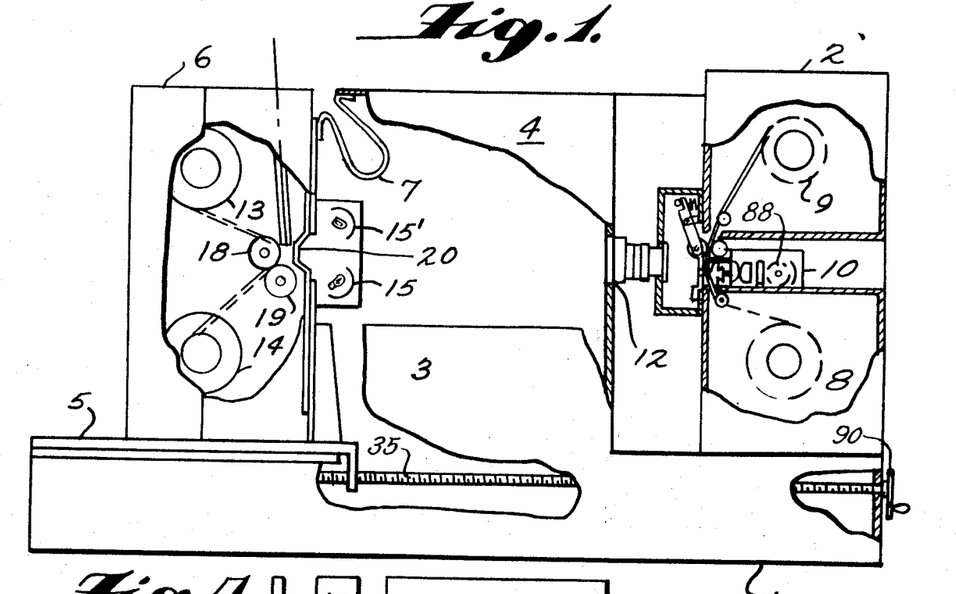
FIG. 1 shows a plan view of one embodiment of the invention.

FIG. 1 shows the basic microfilm copier. The base 1 supports both camera/projector housing 2, the control panel 3, and the cabinet 4, all of which are stationary. Also supported by the base is the paper magazine carriage 5 which in turn supports paper magazine 6. The light shield 7 which is attached to both the cabinet and the paper magazine maintains the microfilm copier in a light tight state. The camera/projector housing 2 contains the film supply magazine 8, the film take-up magazine 9, projection lamp assembly 10, film exposure slot 11 and projection lens 12 as well as film drive and pressure rollers 16 and 17, respectively. The paper magazine contains paper supply roll 13 and paper take-up roll 14 as well as paper projector lights 15 and 15', paper drive and pressure rollers 18 and 19, respectively, and the paper exposure slot 20.

Figure 2:
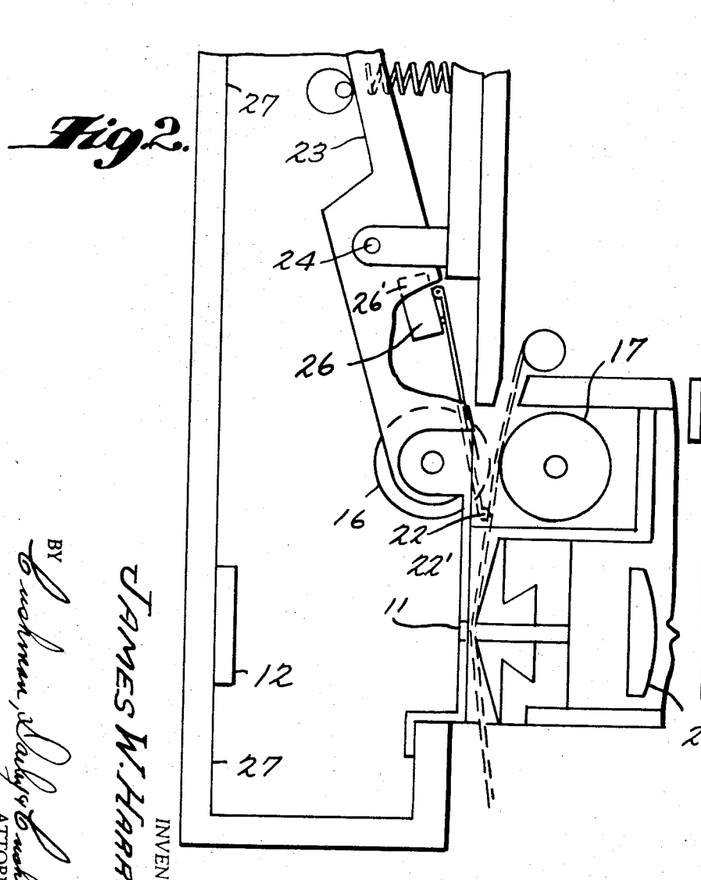
FIG. 2 shows a detail of the camera/projector portion of FIG. 1.

FIG. 2 shows a close-up view of the camera/projector housing shown in FIG. 1. The elements which have been described retain reference numerals given above. Of special interest in this view is the flat condenser lens 21 which forms a portion of the projection lamp assembly. Also of interest is the film pressure roller release lever 23 which pivots about point 24 to apply pressure to the film pressure roller 16. An access door 27 rotates about hinges not shown to allow access to the film exposure slot 11 even when the film take up and supply magazines are in place.

Finally, of interest in FIG. 2 is the end-of-film sensor switch 26 which has an operating arm 22 and a counter 26' having an operating arm 22' in parallel to arm 22. Both the counter and the end-of-film sensor are mounted on pressure roll release lever 23 and the arms 22 and 22' are arranged to engage opposite edges of the film.

Figure 3:
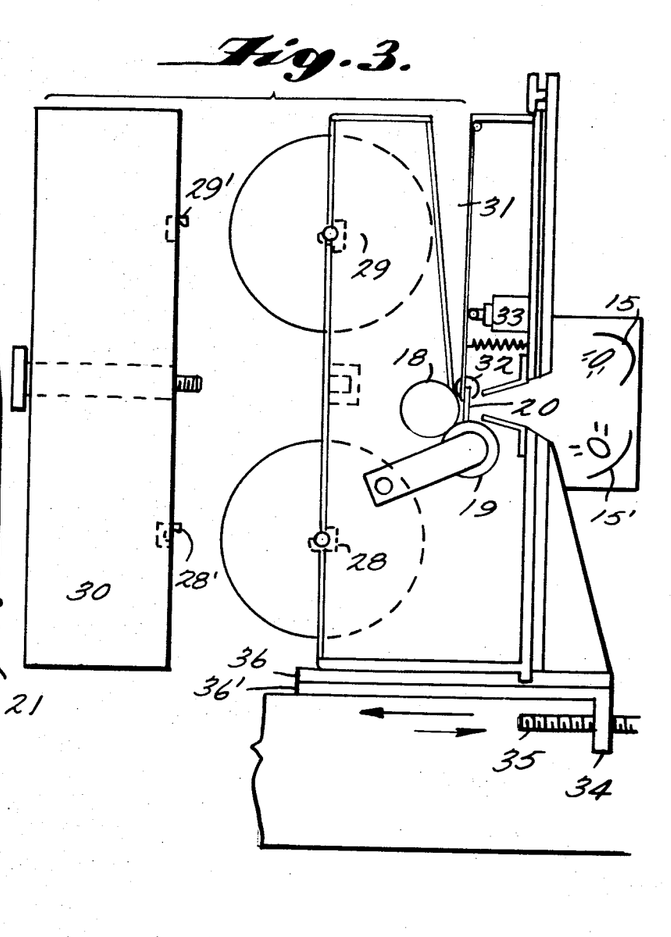
FIG. 3 shows a detail of a portion of the paper magazine shown in FIG. 1.

FIG. 3, a detailed view of the paper magazine, shows the paper supply and take-up roll mounts which are comprised of from lower halves 28 and 29 and upper halves 28' and 29'. These mounts allow the supply and take-up rolls to be mounted even when paper magazine cover 30 is removed from the paper magazine. Also shown in FIG. 3 is a single sheet feed guide 31 and a single sheet feed pinch roller 32 which is engaged with paper drive roller 18 by the action of the single sheet feed pinch roller solenoid 33. Projection lights 15 and 15' are shown to be mounted to the paper magazine carriage, one on either side of the optical axis running from paper exposure slot 20 through projection lens 12 to film exposure slot 11. The right end of the paper magazine carriage drive has a downward projection 34 in which a threaded hole has been machined for jack screw 35. The turning of jack screw causes the paper magazine to slide in a horizontal direction upon the paper magazine carriage which consists of two ball bearing slides 36 and 36' and, as the paper exposure slot becomes further from the projection lens, the magnification factor increases. Of course, the opposite is true as the paper magazine nears the slot.

Figure 4:
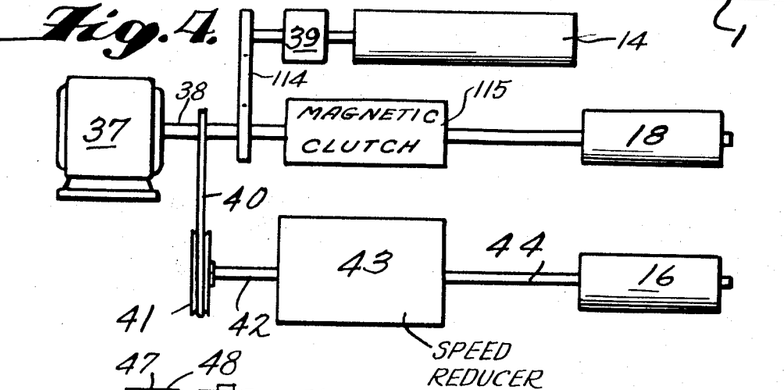
FIG. 4 shows the position of the motor, torque clutch, speed reducer and the paper and film rolls in the drive chain.

FIG. 4 shows in schematic fashion the overall drive system for the microfilm copier. Only one motor 37 is utilized in this system. Output shaft 38 is connected through the variable torque clutch 39 to the paper take up roll 14 by a drive belt 114 and through a standard magnetic clutch 115 to the paper drive roller 18. A drive belt 40 is mounted on shaft 38 between the motor 37 and the standard magnetic clutch 115. This drive belt drives speed reducer pulley 41, which being ten times greater in diameter than shaft 38 rotates one tenth as fast. Attached to the speed reducer pulley 41 is speed reducer input shaft 42 which is connected through speed reducer 43 and speed reducer output shaft 44 to the film drive roller 16.

Figure 5:
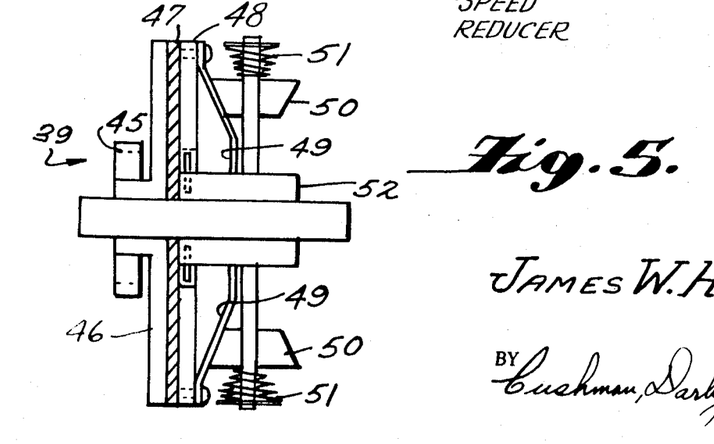
FIG. 5 shows a variable torque clutch.

As is best shown in FIG. 5 the operation of variable torque clutch 39 is as follows: The output shaft from the motor 37 is physically attached to the drive belt 114 and thus to the drive gear 45 and fixed pressure plate 46. The fixed pressure plate in turn transfers torque to the friction washer 47. The friction washer is compressed on its side opposite the fixed pressure plate by movable pressure plate 48 under the compression of springs 49. These springs, are in turn, compressed by weights 50 which are urged inwardly towards the clutch's longitudinal axis by the action of torque springs 51. Completing the torque clutch is the output shaft 52 which is physically connected with the movable pressure plate 48.

Figure 6:
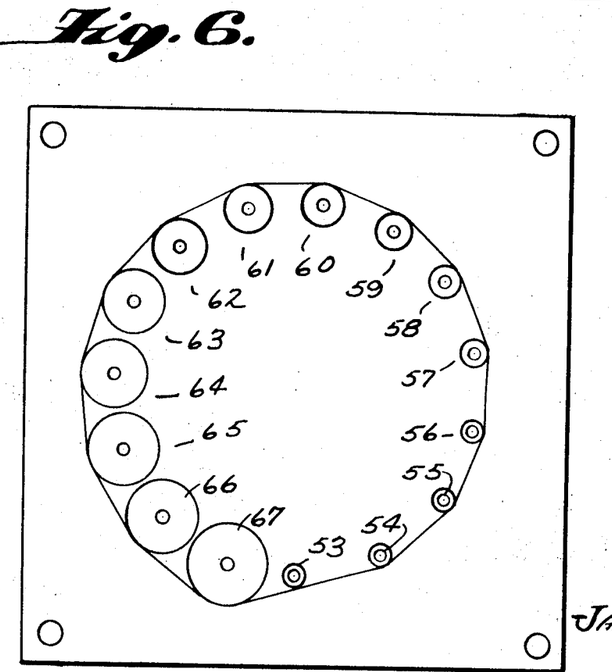
FIG. 6 shows the input side of the speed reducer.
Figure 7:
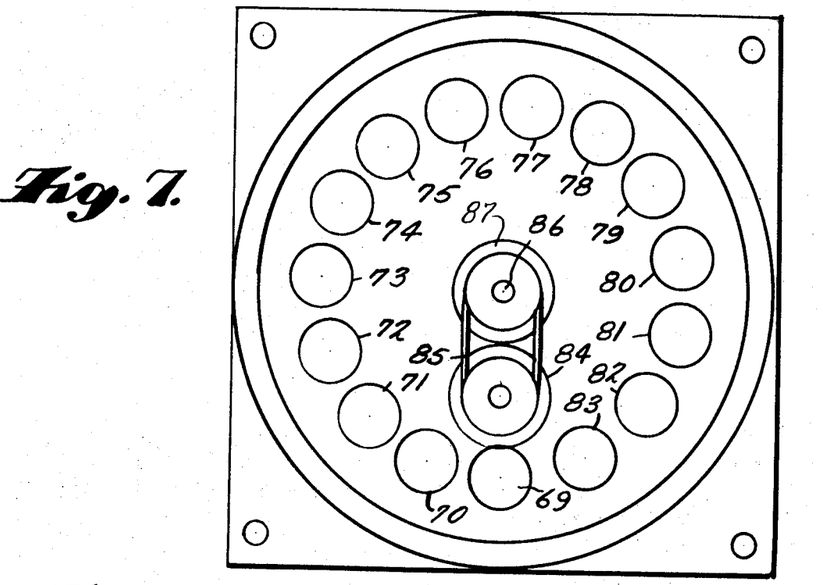
FIG. 7 shows the output side of the speed reducer.

FIGS. 6 and 7, which will be discussed together, show respectively the input and output sides of the speed reducer 43. Reference numeral 53 in FIG. 6 designates a gear belt pulley which is attached to the speed reducer input shaft 42. This pulley and the other gear belt pulleys 54 through 67 are so arranged that their respective axes form a circle. These gear belt pulleys vary in size such that pulley 54 is one-tenth larger in diameter than pulley 53. Pulley 55 is one-tenth larger in diameter than pulley 54, etc. The gear belt pulleys are connected together by means of a gear belt. Turning now to FIG. 7, the other side of the speed reducer, a series of reducer drive gears 69 through 83 are shown. These drive gears are identical to each other in diameter and each drive gear is mounted on a separate shaft which is connected to one of the gear belt pulleys 53 through 67. For instance, reducer drive gear 69 is mounted on the same shaft as the speed reducer input shaft pulley 53. Because of the various diameters of the gear belt pulleys, the reducer drive gears are turning at fifteen different speeds which are related such that reducer gear 70 is rotating nine-tenths as fast as reducer drive gear 69, etc. The reducer drive gears are connected to speed reducer output shaft 52 by means of an idler gear 84 which is carried by idler bracket 85 and is adapted to engage with any one of the reducer drive gears 69 through 83. The idler bracket 85 is adapted to pivot about point 86 which point also forms the axis of speed reducer output shaft. The idler gear 84 is also adapted to engage with output gear 87 which is physically connected to speed reducer output shaft 52. When it is desired to change the ratio of speed reduction the idler bracket 85 is rotated and idler gear 84 is engaged with the proper reducer drive gear 69 through 83. With this speed reducer a range of reduction from 1 to 10 to 1 to 24 can be obtained. When the idler bracket is in the position shown the reduction of the speed is from 1 to 10 because reducer drive gear 69 is connected to the input shaft and the speed reducer itself develops no further reduction. If the idler bracket were rotated counterclockwise, and idler gear 84 meshed with reducer drive gear 83, the reduction of 1 to 24 would be accomplished.

Now that the basic elements which comprise the microfilm copier have been set forth, the operation of this copier will be described. First, the sides of film supply magazine 8 and film take-up magazine 9 are removed and either 16 or 35 mm microfilm is loaded into the supply magazine and the access door 25 is opened exposing film exposure slot 11. Next the end of the film is passed through a slot in the upper left-hand corner of the film supply magazine 8 into the film exposure slot 11 and between the film drive roller and film pressure rollers 16 and 17. The latter which was in its released position is now engaged with the film drive roller by rotating the pressure roller release lever 23 about the point 24. The film is then passed through the slot in the lower left-hand corner of the film take-up magazine and taped to the take-up shaft and the access door is closed. At the same time the film is loaded, photosensitive paper is placed on the paper supply roll 23 of the paper magazine on mount section 28 under dark room conditions. The side to be exposed is turned towards the paper exposure slot 20 and the paper is threaded between paper drive roller 18 and paper pressure roller 19 and wound upon paper take-up roll 14. The cover 30 is then replaced upon the paper magazine ending the necessity for darkroom conditions. Alternatively, the entire paper magazine which has been loaded in a darkroom may be mounted upon the microfilm copier.

For starting operation, a switch (not shown) which is located on the control panel 3 is depressed which supplies power to motor 47. This power is then supplied through variable torque clutch 39 to paper take-up roll 14. The operation of the variable torque clutch is as follows: when the paper take-up roll 14 has little paper upon it and therefore needs little torque to keep the paper taut it is rotating at a relatively great speed. Thus the weights 50 are moved away from the clutch's longitudinal axis and thus release their pressure upon torque springs 49 which, in turn causes the movable pressure plate 48 to be only loosely engaged against friction washer 47 and thus fixed pressure plate 46. In other words, at high speeds with low paper the minimum amount of torque is transferred from input shaft 38 through fixed pressure plate 46 and movable pressure plate 48 to output shaft 52. As the paper take-up roll fills up, its rotational speed is reduced but its torque requirements grow. Thus at lower rotational speeds the weights are forced in toward the clutch's axis by the action of torque springs 51 and thus the pressure on springs 49 is increased whereby more torque is transferred through the fixed and movable pressure plate combination to the output shaft 46. The motor 37 which drives the paper take-up roll 14 also, as described above, drives the film roller through belt 40, pulley 41 and the other speed reducer elements previously described. The film is now moving past the projection slot and being illuminated by projection light 88 and the flat condenser lens 21. Images from the film are then projected through paper exposure slot 20 to the photosensitive paper roll which is moving in synchronism with the film. When all the film has been copied and the film's end has been pulled past the projection slot, the end of film sensor 22 operates to remove power from the projection light and paper drive motor thus stopping the microfilm copier.

If the paper is completely wound upon paper take-up roll 14 before all the film is exposed, the end-of-paper-sensor 90 senses this condition and turns off the film projection lamp 88 as well as first stopping the drive motor and then causing it to reverse direction until the film is backed up approximately 2 inches.

The above explanation assumed that the microfilm copier was operated in the film to paper mode and the camera/projector acted as a camera. As has been previously stated, the microfilm copier may also be operated in the paper to film mode. Then the camera/projector will work as a camera. The paper operation of the paper magazine in the paper to film mode is identical to that described above with three exceptions. First, dark room conditions need not be maintained when loading the paper since the paper is developed. Of course, the developed side of the paper will be turned towards the exposure slot. Second, the low paper sensor 89 will perform no function in the film to paper operation and third, paper projection lights 15 and 15' will be lighted instead of film projection light 88 when the start switch is depressed.

When it is desired to change the magnification factor of the basic microfilm copier, the jack screw 36 is rotated by means of crank 90 until the proper magnification factor is displayed on a magnification factor indicator (not shown). The speed reducer 43 is then adjusted by rotating idler bracket 85 to mesh idler gear 84 with the proper reducer drive gear 69 through 83. This causes a speed reduction which insures that the image at any point on the developed web be it film or paper remains stationary on the photosensitive web paper or film for a time just sufficient to expose the photosensitive web.

Two other modes of operation which are possible using the basic microfilm copier will now be described. First, it is possible to expose lengths of film shorter than 2 inches due to the flat condenser lens construction shown best in FIG. 2. The edge of the short film strip is pinched between the film drive and pressure rollers 16 and 17 which are located immediately above the film exposure slot. The exposure slot itself need have only a very short vertical dimension. It is possible by utilizing the flat condenser lens 21 to build a projector with a maximum vertical dimension including the drive and pressure rollers of 1½ inches.

Secondly, the single sheet mode of operation is also possible with the basic microfilm copier. In this mode, single sheets of paper are inserted into single sheet feed guide 31 and pressed against paper drive roller 18 by single sheet feed pinch roller 32 under the influence of single sheet feed pinch roller solenoid 33. When running in a single sheet mode various attachments to the paper magazines which have not been shown can be used. For instance, a stacker, for single sheets may be mounted at the bottom of the paper magazine or when using folded computer printouts, a special paper guide which allows the printout to unfold without having to reduce them to single sheets may be used.

Figures 8, 9:
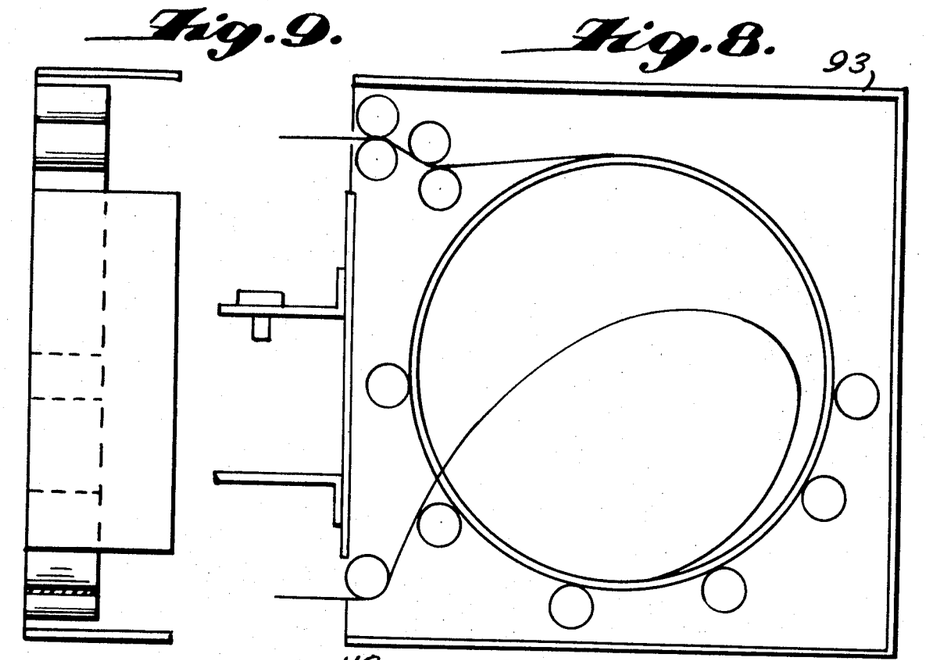
FIGS. 8 and 9 show the film loop magazine modification.

Various modifications to the basic microfilm copier are possible. FIGS. 8 and 9 demonstrate the first of these modifications wherein the film supply and film take-up magazines 8 and 9 are replaced by the film loop magazine 93. When it is desired to make plural copies of a single film, the film loop magazine eliminates the necessity of removing the developed film from the film take-up magazine and replacing it on the film supply magazine. When running in the film loop mode the operator will loop the film and splice it end to end inserting the spliced end between the film drive roller and film pressure rollers 16 and 17 as has been described above with respect to the basic microfilm copier and place the loop in magazine 93. The operation will then be the same as has been described above for the film to paper mode except that the end of film sensor 26 will not operate. Instead, a counter 26' will be operated by the mark made on the film by splicing the ends together to decrement from the number of desired copies, one copy for each complete revolution of the film. When the counter has decremented the number of desired copies to zero, the microfilm copier will be turned off as though the end of film sensor 26 had operated.

Figure 10:
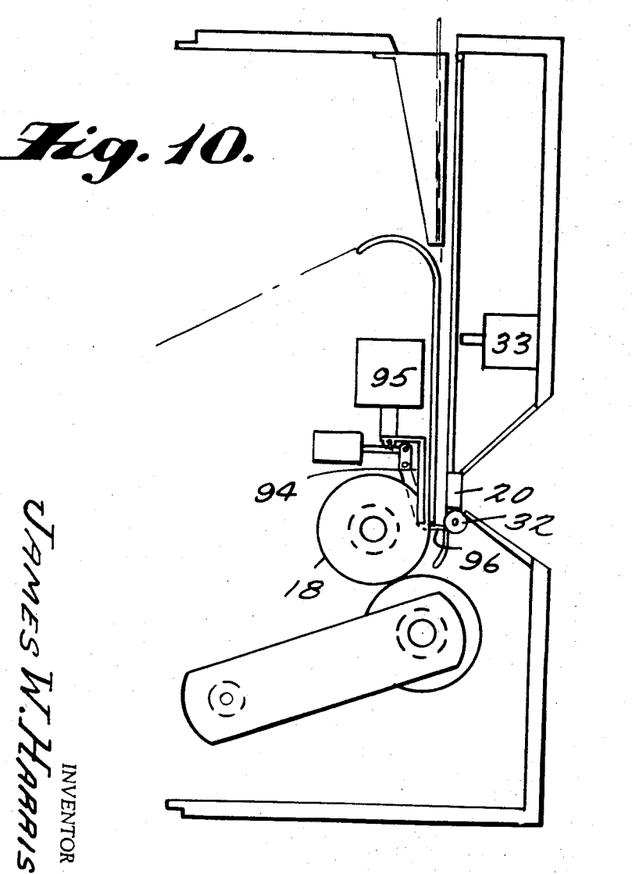
FIG. 10 shows the cutter mark modification.

When operating in the single sheet mode, it is desirable to print adjacent to the image the single sheet on the exposed film a cutter mark. The cutter mark modification which accomplishes this end is shown in FIG. 10. The heart of the cutter mark operator is the cutter mark exposure plate 94. This plate is aligned with the paper exposure slot 20 which is shown to be covered with optical glass and the plate is adapted to be oscillated vertically by cutter mark solenoid 95. The cutter mark exposure plate has a white area and a black area. When the cutter mark solenoid is deactivated the white area is aligned with the exposure slot but when the cutter mark solenoid 95 is activated and the cutter mark exposure plate is drawn up vertically, the black area of the cutter mark exposure plate is aligned with the paper exposure slot. When this happens the film will not be exposed. When the end of paper sensor senses the end of a single sheet, the cutter mark solenoid is energized and thus the film is exposed first to a white and then a black portion which produces a cutter mark adjacent to the trailing edge of the single sheet image.

Also shown in FIG. 10 are stop fingers 96 which when in the position shown, support the bottom edge of a single sheet. When the feed pinch roller 32 is energized by the single sheet, feed pinch roller solenoid 33 stop fingers 96 are moved to the left into slots in the paper drive roller 18 and the single sheet of paper is pressed between drive roller 18 sheet and the single sheet pinch roller 32. If it is desired to utilize the modified paper magazine disclosed in FIG. 10 with roll paper instead of single sheet, the roll paper is stretched over the roll paper guide, the paper drive roller 18 and paper pressure roller 19 instead of, as shown in the basic microfilm copier, being wound directly onto drive roller 18.

Figure 11:
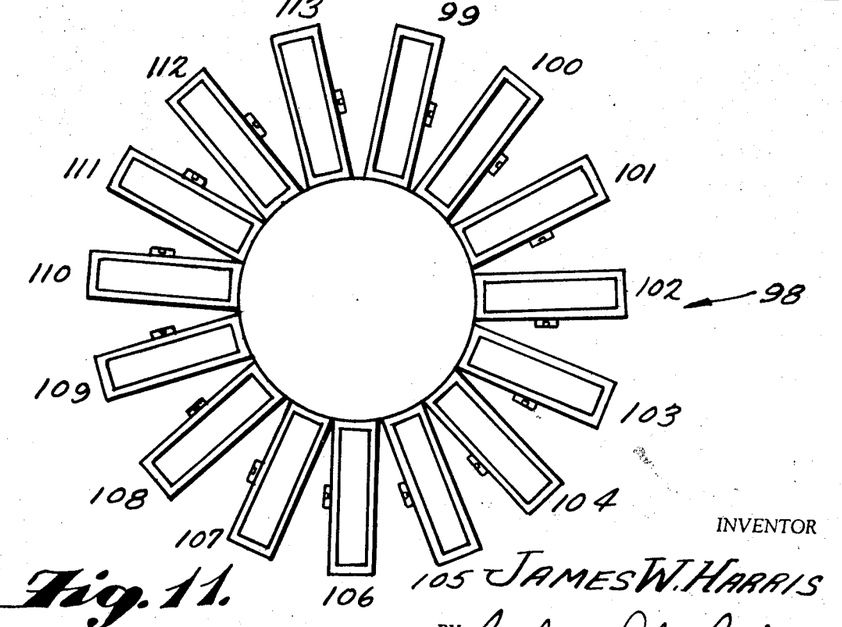
FIG. 11 shows the lens drum modification.

A third modification to the basic microfilm copier is shown in FIG. 11. In the basic microfilm copier the magnification factor is changed by changing the distance between the paper magazine exposure slot and the projection lens. In the modification shown in FIG. 11, the magnification factor is changed by rotating projection lens drum 98. Mounted to the periphery of the projection lens drum are projection lenses 99 through 114. Each of these lenses has a different modification factor which is correlated with one of the 15 positions of the speed reducer. The axis of the projection lens drum is located parallel to the optical axis of microfilm copier and far enough from this axis so that each projection lens can be placed in optical alignment with the film and paper exposure slots by rotating the projection lens drum. The position of the projection lens drum can be sensed and directed from the control panel 3 by well known means either mechanical or electrical. Thus an operator can select the proper magnification factor and correlate this with the speed reducer which is also controllable by standard means from the control panel. As was shown in FIG. 11, the projection lenses 99 through 114 are flat. That is, they like the condenser lens discussed above, are standard in their cross-sectional dimensions and horizontal dimensions (direction transverse to film travel) but are shorter than standard in the vertical (direction parallel to film travel). Thus the projection lens may be much smaller mechanically without any loss of optical properties.

Figure 12:
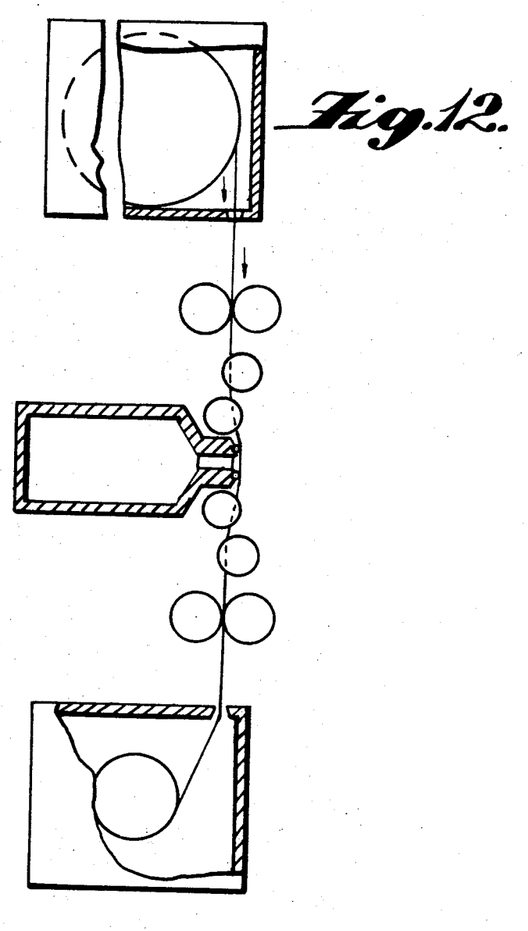
FIG. 12 shows another embodiment of the invention.

In the basic microfilm copier and in the modifications thus far described the copying is from paper to film or from film to paper. It is however, possible to replace the paper magazine of the microfilm copier with a film magazine as shown in FIG. 12 which is similar in operation to the paper magazine shown in FIGS. 1 and 3. The change to film to film copying will also necessitate a change in speed reducers since the difference in film size would not exceed 4 to 1. One way of accomplishing the proper speed reduction with the existing drive would be to provide a second speed reducer pulley 115 which would drive speed reducer input shaft 50 at a rate 4 times slower than motor output shaft 38.

What is claimed is:
1. A microfilm copier comprising:
a microfilm web,
a roll of photosensitive paper,
magazines for said microfilm and said paper,
a lens and a projector lamp assembly for projecting an image from the microfilm to the paper along an optical axis,
means for driving said microfilm,
means for driving said paper including a motor, a shaft driven by said motor, a variable torque clutch attached to said shaft, an output shaft from said variable torque clutch, and means for engaging said photosensitive paper mounted upon said output shaft,
means for correlating the driving of said paper and microfilm at such a rate relative to each other than the image of any point on the microfilm remains stationary on the photosensitive paper for a time sufficient to properly expose said photosensitive paper,
means for changing the magnification factor between said microfilm and photosensitive paper and
means for varying the relative rate between the microfilm and the photosensitive paper when the magnification factor is changed whereby the photosensitive paper is properly exposed at each magnification factor.

2. A microfilm copier of claim 1 wherein said projecter lamp assembly comprises a projection lamp and a condenser lens which has a smaller than standard dimension parallel to the direction of film travel and standard dimensions in directions perpendicular to film travel.

3. The microfilm copier of claim 1 wherein the means for changing magnification factor between said photosensitive paper and said microfilm comprises a sliding carriage which has a longitudinal axis in the plane of the optical axis of the microfilm copier whereby the distance between the paper and microfilm is changed.

4. The microfilm copier of claim 3 wherein said means for changing the distance between said paper and microfilm comprises a jack screw attached at one end to a crank and at the other end to said sliding carriage.

5. The microfilm copier of claim 1 wherein said means for changing the magnification factor between said photosensitive microfilm and said paper comprises a plurality of lenses, each lens having a different magnification factor, and means for positioning any one of said plurality of lenses along the optical axis of said microfilm copier at the proper position for focusing an image projected from said microfilm to said paper.

6. A microfilm copier of claim 5 wherein said means for positioning comprises a drum and a plurality of lenses radially attached to the circumference of said drum, said drum being mounted to rotate about an axis parallel to the optical axis of said microfilm copier and displaced therefrom by such a distance that any one of said plurality of lenses can be placed and registered with said optical axis by rotating said drum.

7. A microfilm copier of claim 5 wherein each of said plurality of lenses has a smaller than standard dimension parallel to the direction of film travel and standard dimensions in the directions perpendicular to the direction of film travel.

8. A microfilm copier as claimed in claim 1 wherein said variable torque clutch comprises a first pressure plate affixedly attached to said motor driven shaft, a friction washer in contact with said first pressure plate, a second pressure plate in contact with said friction washer, for compressing said friction washer against said first pressure plate, a plurality of torsion springs for applying pressure to said second pressure plate, an output shaft affixedly attached to said second pressure plate, and means for adjusting the tension on said plurality of tension springs as a function of the output shaft speed to thus vary the torque transferred to the output shaft.

9. A microfilm copier comprising:
a microfilm web,
a roll of image-bearing paper,
magazines for said paper and said microfilm,
a lens and a projector lamp assembly for projecting an image from the image-bearing paper to the microfilm along an optical axis,
means for driving said image-bearing paper including a motor, a shaft driven by said motor, a variable torque clutch attached to said shaft, an output shaft from said variable torque clutch, and means for mounting said roll upon said output shaft,
means for driving said microfilm web,
means for correlating the driving of said microfilm and paper at such a rate relative to each other that the image of any point on the paper remains stationary on the microfilm for a time sufficient to properly expose said microfilm,
means for changing the magnification factor between said microfilm and said paper and
means for varying the relative rate between the microfilm and paper when the magnification factor is changed whereby the microfilm is properly exposed at each magnification factor.

10. A microfilm copier as claimed in claim 9 wherein said variable torque clutch comprises a first pressure plate affixedly attached to said motor driven shaft, a friction washer in contact with said first pressure plate, a second pressure plate in contact with said friction washer, or compressing said friction washer against said first pressure plate, a plurality of torsion springs for applying pressure to said second pressure plate, an output shaft affixedly attached to said second pressure plate, and means for adjusting the tension on said plurality of tension spring as a function of the output shaft speed to thus vary the torque transferred to the output shaft.

11. The microfilm copier of claim 8 wherein said means for adjusting tension comprises a plurality of weights in contact with said tension springs, a plurality of shafts radially mounted on the circumference of said output shaft upon which said weights are slidably mounted for radial movement under the influences of centrifugal force, and torque springs for restraining the movement of said weights at lower speeds but not at higher speeds wherein said weights are so positioned relative to said tension springs that said tension springs are more greatly compressed when said weights are near the axis of the output shaft and when said weights travel away from said axis.

12. The microfilm copier of claim 10 wherein said means for adjusting tension comprises a plurality of weights in contact with said tension springs, a plurality of shafts radially mounted on the circumference of said output shaft upon which said weights are slidably mounted for radial movement under the influences of centrifugal force, and torque springs for restraining the movement of said weights at lower speeds but not a higher speeds wherein said weights are so positioned relative to said tension springs that said tension springs are more greatly compressed when said weights are near the axis of the output shaft and when said weights travel away from said axis.

13. A microfilm copier comprising:
a microfilm image web,
a roll of image-bearing paper,
magazines for said paper and microfilm,
a lens and a projector lamp assembly for projecting an image from the paper to the microfilm along an optical axis,
means for driving said paper and said microfilm including a motor and drive shaft,
means for correlating the driving of said microfilm and paper at such a rate relative to each other that the image of any point on the paper remains stationary on the microfilm for a time sufficient to properly expose said microfilm including a speed reducer which comprises a belt connected to said drive shaft, a pulley connected to said belt, a speed reducer input shaft adapted to rotate with said pulley, wherein the ratio of said drive shaft diameter to said pulley diameter is such that said pulley and said input shaft rotate at a speed slower than said drive shaft, a plurality of input pulleys of various diameters connected by a second belt to said input shaft, a plurality of drive gears of uniform diameter, one of each said drive gears being connected to one of said pulley shafts, wherein said pulley shafts are arranged on a circle, an idler gear positioned to mesh with any one of said plurality of drive gears, an idler bracket in which said idler is mounted to said bracket being mounted to pivot about the center of said circle, an output gear which meshes with said idler gear, and an output shaft upon which said output gear is mounted for driving said photosensitive web,
means for changing the magnification factor between said paper and microfilm and
means for varying the relative rate between the microfilm and paper when the magnification factor is changed whereby the microfilm is properly exposed at each magnification factor.

14. A microfilm copier comprising:
a microfilm web,
a roll of image-bearing paper,
magazines for said paper and microfilm,
a lens and a projector lamp assembly for projecting an image from the paper to the microfilm along an optical axis,
means for driving said paper and said microfilm including a motor and drive shaft,
means for correlating the driving of said microfilm and paper at such a rate relative to each other that the image of any point on the paper remains stationary on the microfilm for a time sufficient to properly expose said microfilm including a speed reducer,
means for changing the magnification factor between said paper and microfilm and
means for varying the relative rate between the microfilm and paper when the magnification factor is changed whereby the microfilm is properly exposed at each magnification factor.

15. The photo copier of claim 14 wherein said speed reducer comprises a belt connected to said drive shaft, a pulley connected to said belt, a speed reducer input shaft adapted to rotate with said pulley, wherein the ratio of said drive shaft diameter to said pulley diameter is such that said pulley and said input shaft rotate at a speed slower than said drive shaft, a plurality of input pulleys of various diameters connected by a second belt to said input shaft, a plurality of drive gears of uniform diameter, one of each said drive gears being connected to one of said pulley shafts, wherein said pulley shafts are arranged on a circle, an idler gear positioned to mesh with any one of said plurality of drive gears, an idler bracket in which said idler is mounted to said bracket being mounted to pivot about the center of said circle, an output gear which meshes with said idler gear, and an output shaft upon which said output gear is mounted for driving said photosensitive web.

16. A microfilm copier comprising:
a plurality of single sheets of image-bearing paper,
a microfilm web,
magazines for said image-bearing papers and said microfilm,
a lens and a projector lamp assembly for projecting an image from the image-bearing papers to the microfilm along an optical axis,
means for driving said image-bearing papers so as to sequentially project images of each,
means for driving said microfilm,
means for correlating the driving of said microfilm and papers at such a rate relative to each other that the image of any point on a paper remains stationary on the microfilm for a time sufficient to properly expose said microfilm,
means for changing the magnification factor between said papers and microfilm,
means for varying the relative rate between a paper and microfilm when the magnification factor is changed whereby the microfilm is properly exposed at each magnification factor, and means for producing cutter marks on the exposed film.

17. The microfilm copier of claim 15 wherein said means for producing cutter marks comprises an exposure plate having a white portion and a black portion said plate being positioned on the opposite side of said single sheets of image-bearing paper from said film, and means for alternately exposing said white and black portions to said film after each single sheet is exposed.

18. A microfilm copier comprising:
a microfilm web,
a roll of photosensitive paper,
a magazine for said microfilm including a plurality of support rollers for supporting a roll of film when said microfilm is rolled into a loose loop spliced end to end and said loop is placed in contact with said support rollers,
a magazine for said paper,
a lens and a projector lamp assembly for projecting an image from the microfilm to the paper along an optical axis,
means for driving said microfilm,
means for driving said paper,
means for correlating the driving of said paper and microfilm at such a rate relative to each other that the image of any point on the microfilm remains stationary on the paper for a time sufficient to properly expose said paper,
means for changing the magnification factor between said microfilm and paper and
means for varying the relative rate between the microfilm and paper when the magnification factor is changed whereby the paper is properly exposed at each magnification factor.

19. A microfilm copier comprising:
a plurality of single sheets of an image-bearing paper,
a microfilm web,
magazines for said image-bearing papers and said microfilm,
a lens and a projector lamp assembly for projecting an image from the image-bearing papers to the microfilm along an optical axis,
means for driving said image-bearing papers so as to sequentially project images of each,
means for driving said microfilm,
means for correlating the driving of said microfilm and papers at such a rate relative to each other that the image of any point on a paper remains stationary on the microfilm for a time sufficient to properly expose said microfilm,
means for changing the magnification factor between said papers and microfilm,
means for varying the relative rate between a paper and microfilm when the magnification factor is changed whereby the microfilm is properly exposed at each magnification factor, and
a stop for holding said single sheets perpendicular to and centered on the optical axis of said microfilm copier, and
means for retracting said stop, wherein said means for retracting said stop are energized simultaneously with the means for driving said image-bearing single sheets.

20. A microfilm copier comprising:
a microfilm web,
a roll of photosensitive paper,
a magazine for said microfilm,
a magazine for said paper including bracket means which allows said paper to be positioned on said magazine when the cover of said magazine is removed whether said magazine is vertically or horizontally disposed,
a lens and a projector lamp assembly for projecting an image from the microfilm to the paper along an optical axis,
means for driving said microfilm,
means for driving said paper including,
means for correlating the driving of said paper and microfilm at such a rate relative to each other that the image of any point on the microfilm remains stationary on the photosensitive paper for a time sufficient to properly expose said photosensitive paper,
means for changing the magnification factor between said microfilm and photosensitive paper and
means for varying the relative rate between the microfilm and the photosensitive paper when the magnification factor is changed whereby the photosensitive paper is properly exposed at each magnification factor.

21. A microfilm copier comprising:
a microfilm web,
a roll of image-bearing paper,
a magazine for said paper including bracket means which allows said rolls of image-bearing paper to be positioned on said magazine when the cover of said magazine is removed whether said magazine is veriically or horizontally disposed,
a magazine for said microfilm,
a lens and a projector lamp assembly for projecting an image from the image-bearing-paper to the microfilm along an optical axis, means for driving said image-bearing paper,
means for driving said microfilm web,
means for correlating the driving of said microfilm and paper at such a rate relative to each other that the image of any point on the paper remains stationary on the microfilm for a time sufficient to properly expose said microfilm,
means for changing the magnification factor between said said microfilm and said paper and means for varying the relative rate between the microfilm and paper when the magnification factor is changed whereby the microfilm is properly exposed at each magnification factor.

22. The microfilm copier of claim 1 further including an access door means for threading said microfilm.

23. The microfilm copier of claim 9 further including an access door means for threading said microfilm.

* * * * *